(12) United States Patent
Hood et al.

(10) Patent No.: US 9,512,325 B2
(45) Date of Patent: Dec. 6, 2016

(54) COMPOSITIONS COMPRISING A REACTIVE MONOMER AND USES THEREOF

(75) Inventors: David K. Hood, Basking Ridge, NJ (US); Osama M. Musa, Kinnelon, NJ (US)

(73) Assignee: ISP INVESTMENTS LLC, Wilmington, DE (US)

( * ) Notice: Subject to any disclaimer, the term of this patent is extended or adjusted under 35 U.S.C. 154(b) by 477 days.

(21) Appl. No.: 13/520,860

(22) PCT Filed: Dec. 22, 2010

(86) PCT No.: PCT/US2010/061848
§ 371 (c)(1),
(2), (4) Date: Oct. 24, 2012

(87) PCT Pub. No.: WO2011/084833
PCT Pub. Date: Jul. 14, 2011

(65) Prior Publication Data
US 2013/0150481 A1    Jun. 13, 2013

Related U.S. Application Data

(60) Provisional application No. 61/293,834, filed on Jan. 11, 2010.

(51) Int. Cl.
| | | |
|---|---|---|
| *C08F 26/06* | (2006.01) | |
| *C08F 26/08* | (2006.01) | |
| *C08F 220/36* | (2006.01) | |
| *C08F 222/22* | (2006.01) | |
| *C08F 226/10* | (2006.01) | |
| *C08L 79/04* | (2006.01) | |
| *C09D 11/00* | (2014.01) | |
| *C09D 11/101* | (2014.01) | |
| *C09D 133/14* | (2006.01) | |

(52) U.S. Cl.
CPC ............... *C09D 11/00* (2013.01); *C08F 26/06* (2013.01); *C08F 26/08* (2013.01); *C08F 220/36* (2013.01); *C08F 222/22* (2013.01); *C08L 79/04* (2013.01); *C09D 11/101* (2013.01); *C09D 133/14* (2013.01); *C08F 226/10* (2013.01)

(58) Field of Classification Search
CPC ..... C08F 220/36; C08F 222/22; C08F 226/10; C08F 26/06; C08F 26/08; C08L 79/04; C09D 11/00; C09D 133/14; C09D 11/101
USPC ... 523/160, 161; 524/495, 496; 522/96, 167, 522/175; 526/258, 264
See application file for complete search history.

(56) References Cited

U.S. PATENT DOCUMENTS

| | | |
|---|---|---|
| 2,882,262 A | 4/1959 | Smith et al. |
| 4,680,368 A | 7/1987 | Nakamoto et al. |
| 6,787,583 B2 | 9/2004 | Veya et al. |

OTHER PUBLICATIONS

PCT International Search Report PCT/US2010/061848, Feb. 24, 2011.

*Primary Examiner* — Patrick Niland
(74) *Attorney, Agent, or Firm* — William J. Davis

(57) ABSTRACT

Disclosed herein are compositions that include at least one reactive monomer that includes a lactam functional group and an ester functional group represented by formula (1): and a reactive co-solvent having a carbon-carbon double bond. The reactive monomer is one that is capable of reacting with the co-solvent to form a polymer. The compositions may be an ink composition including curable ink compositions.

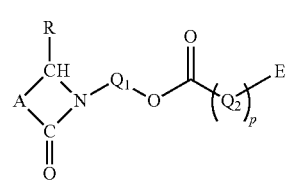

(1)

22 Claims, No Drawings

COMPOSITIONS COMPRISING A REACTIVE MONOMER AND USES THEREOF

FIELD OF THE INVENTION

This application relates to compositions comprising a reactive monomer that are suitable for inks or ink coatings and processes for preparing the same, and more particularly, to composition wherein the reactive monomers comprise a lactam functional group and an ester functional group that provide the reactive monomers with polymerizable functionality.

BACKGROUND OF THE INVENTION

Commercial printing processes are dominated by lithography, flexography, letterpress, screen printing and electrophotographic printing. Rapidly evolving technologies for sublimation/melt-type printing and ink jet are becoming more commercially attractive processes. Increasing in influence of these printing technologies is curable ink systems.

A distinguishing feature of printing ink is its visual appearance. The color, transparency, intensity or density, and gloss often determine the suitability of the ink for a particular application. Another distinguishing feature of printing ink is its adhesion to surfaces, resistance to scratching and defacement, impact resistance, resistance to heat, resistance to solvents or other media, lightfastness, UV stability, and flexibility.

In many printing processes, once these challenges are met, the ink is then evaluated for suitability for color matching. Color matching often requires the use of one colored ink in concert with other different colored inks. In one example, International Commission on Illumination (CIE) color matching provides for an increase in the color spectrum though a process of mixing primary colors (red, green, and blue) to produce secondary colors (cyan, magenta, and yellow) and myriads of possibilities between them. For such a system to function properly, the ink must be truly compatible, not only in physical/chemical properties, but in color properties too.

There are many raw materials employed in the manufacturing of ink products. The four basic components of a printing ink are pigments and dyes, resins, solvents, and additives. These components can be broken down into further details covering potential ingredients such as pigments and dyes, oils, resins, solvents, plasticizers, waxes, driers, chelating agents, anti-oxidants, surfactants, deodorants and fragrances, defoaming agents, adhesion promoters, photo-initiators, reactive diluents, oligomers, inhibitors, and laking agents. Not all of these ingredients will be used for all inks and some ingredients are capable of serving more than one purpose.

Viscosity is a key element to the physical properties and commercial performance capabilities of an ink system. As indicated in the Kipphan's Handbook of Print Media: Technologies and Production Methods (Springer Verlag, New York, 2001) and Leach and Pierce's Printing Ink Manual (Kluwer, Boston, 1999) typical ranges of viscosity are presented below in Table 1.

TABLE 1

Typical Viscosity Ranges for Various Printing Processes

| Printing Process | Typical Viscosity Range (Pa*s) |
|---|---|
| Lithography | 2 to 30 |
| Offset | 40 to 100 |
| Letterpress | 50 to 150 |
| Sublimation and Melt-Type printing | solid at room temperature and melts at elevated temperature |
| Electrophotographic | ~0.1 to 10, for liquid toner Solid, for dry toner |
| Flexography | 0.05 to 0.5 |
| Gravure | 0.01 to 0.2 |
| Screen | 1.5 to 2.0 or higher |
| Ink-jet | ~0.001 to 0.1 |
| Intaglio | 9 to 25 |

Typical techniques for measuring the viscosity of an ink system include capillary viscometers, falling sphere viscometers, flow cups (i.e., Zahn, Shell and Ford), rotational viscometers, cone and plate viscometers (i.e., Haake, TA Instruments), controlled stress rheometers, falling bar viscometers and the like.

As printing speeds become faster and materials more specialized, certain aspects of the printing process have evolved. For example, in some printing press applications, it is not uncommon to employ substrates that are pre-treated, by providing a primer coating to enable adhesion to the surface or surface treating with corona or flame, thereby enabling good ink performance on the substrate despite the added cost in materials and/or production time.

Printing technologies are applied to many different surfaces. For example, polyester film, polyolefin film (PE and PP), polycarbonate, polyimide film, metals (i.e., aluminum, steel, copper), glass, vinyl film, Tyvec® material, canvas, polyvinylidene chloride films, paper, polyurethane, ceramics, wood and the like.

Given the many requirements and challenges for reactive materials in ink applications, new reactive monomers and compositions containing them may be developed as discussed herein.

SUMMARY OF THE INVENTION

In one aspect, compositions are disclosed herein that include at least one reactive monomer that includes a lactam functional group and an ester functional group represented by formula (1):

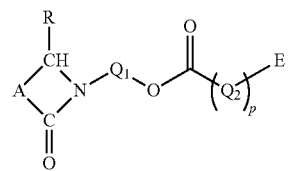

and a reactive co-solvent having a carbon-carbon double bond. The reactive monomer is one that is capable of reacting with the co-solvent to form a polymer.

Within formula (1) A is an alkyl or alkenyl group comprising 2 to 50 carbon atoms, wherein 2 to 4 carbon atoms reside in the lactam ring between the

group and the

group; E is a polymerizable moiety selected from the group consisting of: alkylacrylamides, acrylates, allyl derivatives, benzoxanes, cinnamyls, epoxies, fumarates, maleates, maleimides, αβ-olefinically unsaturated carboxylic nitriles, oxazolines, oxetanes, styrenes, vinyl acetates, vinyl acrylamides, vinyl amides, vinyl carbonates, vinyl ethers, vinyl halides, vinyl imidazoles, vinyl lactams, vinyl pyridines, vinyl silanes, vinyl sulfones, and mixtures thereof; p is 0 or 1; each of $Q_1$ and $Q_2$ is independently selected from the group consisting of functionalized and unfunctionalized alkyl, cycloalkyl, alkenyl, and aryl groups, wherein any of the beforementioned groups may be with or without heteroatoms; and each of R is independently selected from the group consisting of hydrogen, and functionalized and unfunctionalized alkyl, cycloalkyl, alkenyl, and aryl groups, wherein any of the beforementioned groups may be with or without heteroatoms; and The compositions may be an ink composition including curable ink compositions that include a curing initiator. The ink composition may be a lithographic ink, a flexographic ink, a gravure ink, a letterpress ink, a screening printing ink, ink-jet printing ink, an electrophotographic ink, an intaglio printing ink, or a collotype printing ink.

In one aspect, the compositions may be a coating.

In another aspect, the compositions may be an adhesive.

DETAILED DESCRIPTION OF THE INVENTION

The term "reactive monomer" throughout the specification and the claims is defined as a material comprised of a carbon-carbon double bond. When activated as described herein, the carbon-carbon double bond reacts with other carbon-carbon double bonds to form a polymeric material.

The term "curing" throughout the specification and the claims refers to the process of polymerizing, e.g., converting a liquid to a solid, by exposure to appropriate energy source. The resulting cured product is incapable of demonstrating a molecular weight as determined by gel permeation chromatography (GPC).

The term "lithography" throughout the specification and the claims refers to a printing process that employs a flat printing plate. The printable area is usually ink-receptive while the non-printable area repels ink.

The term "flexography" throughout the specification and the claims refers to a relief printing process. This process employs rubber or photopolymer plates and an ink system. Typically, printing is achieved via transfer of the ink from an anilox roller.

The term "letterpress" throughout the specification and the claims refers to a relief printing process employing rubber or photopolymer plates and an ink system. Typically, printing is achieve via transfer of the ink from a roller and pressed into contact with the substrate.

The term "screen printing" throughout the specification and the claims refers to a stencil printing process. A rubber squeegee is employed to push ink through a stencil onto a substrate.

The term "ink-jet" throughout the specification and the claims refers to a computer controlled stream of ink droplets, ejected at high speed, onto a printing surface.

The term "electrophotographic" throughout the specification and the claims refers to a printing process whereby light is used to selectively discharge an electrostatic field, forming an electrostatically charged image. Toner of a proper charge is then transfer to the substrate and fused to the surface by heat or other process.

The compositions herein may be curable ink systems that include a reactive monomer. The curable ink system may have a polymerization process that involves reacting the reactive monomer with another reactive component of the curable ink system or with the same or different additional reactive monomers. The ink compositions, whether curable or not, may be a lithographic ink, a flexographic ink, a gravure ink, a letterpress ink, a screening printing ink, ink-jet printing ink, an electrophotographic ink, an intaglio printing ink, or a collotype printing ink. The polymerization process may be initiated by thermal effects or irradiation such as by exposure to α, γ, and x-rays, UV, E-beam, and the like.

Among the properties that can be beneficially impacted by the reactive monomers are solution viscosity, cure speed, adhesion, impact resistance, toughness, coating hardness, surface tension, wetting, foaming, tensile strength, solvency, dispersive properties, flexibility, chemical resistance, abrasion resistance, and penetration.

The reactive monomers have a lactam functional group and an ester functional group represented by formula (1):

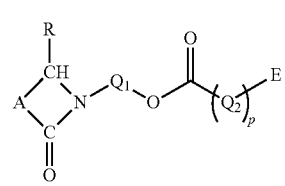

(1)

wherein:
A is an alkyl or alkenyl group comprising 2 to 50 carbon atoms, wherein 2 to 4 carbon atoms reside in the lactam ring between the

group and the

group;
E is a polymerizable moiety selected from the group consisting of: alkylacrylamides, acrylates, allyl derivatives, benzoxanes, cinnamyls, epoxies, fumarates, maleates, maleimides, αβ-olefinically unsaturated carboxylic nitriles, oxazolines, oxetanes, styrenes, vinyl acetates, vinyl acrylamides, vinyl amides, vinyl carbonates, vinyl ethers, vinyl halides, vinyl imidazoles, vinyl lactams, vinyl pyridines, vinyl silanes, vinyl sulfones, and mixtures thereof;
p is 0 or 1;
each of $Q_1$ and $Q_2$ is independently selected from the group consisting of functionalized and unfunctionalized alkyl, cycloalkyl, alkenyl, and aryl groups, wherein any of the beforementioned groups may be with or without heteroatoms; and
each of R is independently selected from the group consisting of hydrogen, and functionalized and unfunctionalized alkyl, cycloalkyl, alkenyl, and aryl groups, wherein any of the before mentioned groups may be with or without heteroatoms.

Referring to formula (1), in one embodiment -A- reside in the lactam ring as a

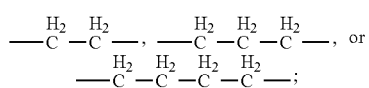

the formed lactam rings are pyrrolidone, piperidone, and caprolactam, respectively. In another embodiment, -A- is

such that structure (1) can be described by the structures:

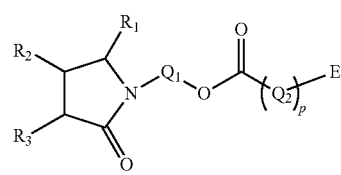

(2)

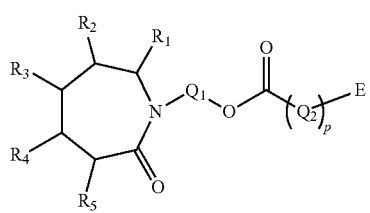

(3)

wherein each $R_1$ through $R_5$ is independently selected from the group consisting of hydrogen, and functionalized and unfunctionalized alkyl, cycloalkyl, alkenyl, and aryl groups, wherein any of the before mentioned groups may be with or without heteroatoms. In non-limiting, embodiments $R_1$ through $R_5$ are hydrogen, for which structures (2) and (3) take the forms:

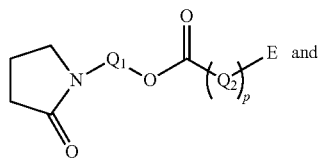

(4)

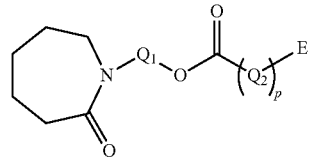

(5)

While $Q_1$ retains its earlier definition, in one embodiment $Q_1$ is independently selected from the group consisting of: aryl, functionalized aryl, methyl, ethyl, and propyl. In another embodiment, $Q_1$ may be a methyl, ethyl, propyl, isopropyl, n-butyl, methylpropyl, n-pentyl, and methylbutyl. In other embodiments, $Q_1$ may be any of the group illustrated below in structures (6) to (11) when -A- is

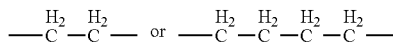

as shown in structures (4) and (5).

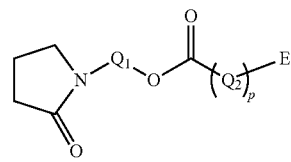

(6)

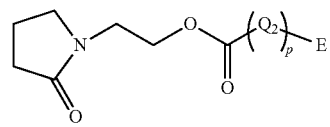

(7)

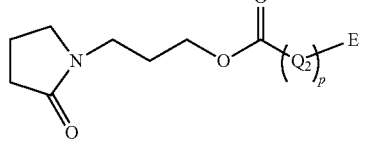

(8)

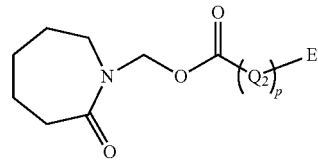

(9)

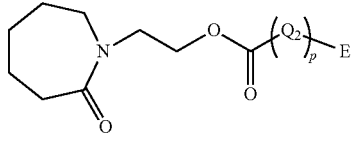

(10)

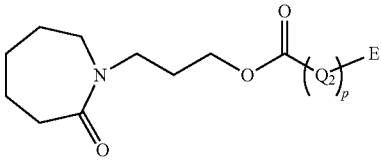

(11)

Further in the structures (6)-(11), ($Q_2$)-E may be the residue of an acrylate, (meth)acrylate, or anhydride following reaction with an N-hydroxyalkyl lactam. Such structures include those identified in U.S. Pat. No. 2,882,262, which is hereby incorporated by reference in its entirety. Examples of structures (6)-(11) having (Q$_2$)-E as residue of an acrylate, (meth)acrylate, or anhydride following reaction with an N-hydroxyalkyl lactam to provide a first polymerizable unit are presented below as structures (12)-(23).

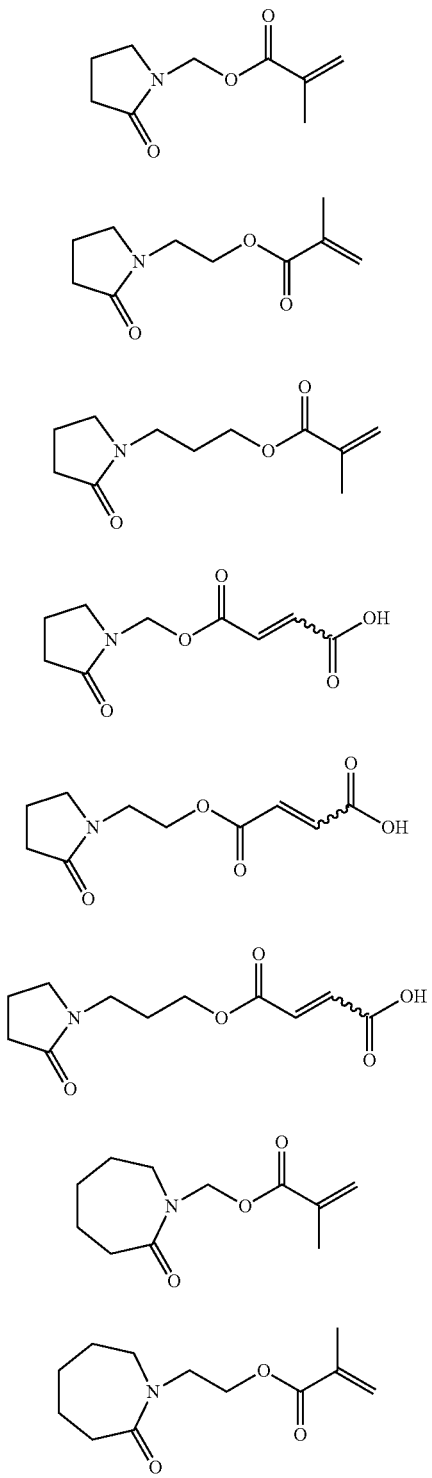

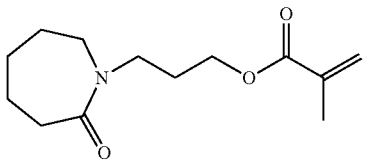

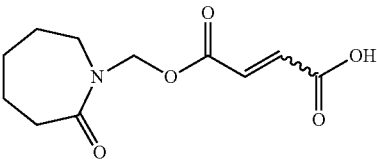

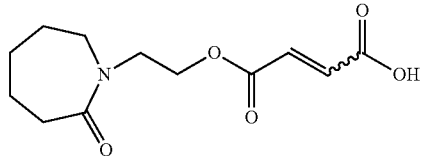

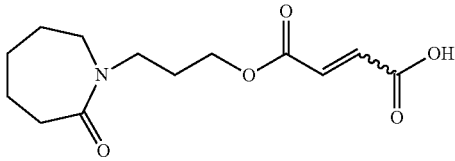

In one embodiment, E is an alkyacrylamide, but not acrylamide or methacrylamide

In addition to the reactive monomers, the compositions disclosed herein may include reactive co-solvents. The reactive co-solvents may include (meth)acryl monomers or pre-polymers, a (meth)acryl ester of an epoxy type monomer or pre-polymer, and a urethane type monomers or pre-polymers. The reactive co-solvents include a carbon-carbon double bond capable of reacting with the polymerizable unit of the reactive monomers, which itself includes a carbon-carbon double. In one embodiment, a mixture of reactive co-solvents may be in the formulation with the reactive monomer.

Examples of reactive co-solvents include but are not limited to 2-hydroxy methyl methacrylate (HEMA), 2-hydroxy ethyl acrylate (HEA), 2-phenoxy ethyl acrylate (PHEA), 2-ethylhexyl-diglycol acrylate, 2-(2-ethoxyethoxy) ethyl acrylate (EOEOEA), lauryl acrylate (LA), Stearyl acrylate (SA), isobornyl acrylate (IBOA), acrylic acid-2-ethylhexyl ester, isodecyl acrylate, acryloyl morpholine (ACMO), cyclic trimethylol-propane formal acrylate (CTFA), 3-(Methacryloylamino)propyl]trimethylammonium chloride (MAPTAC), (3-Acrylamidopropyl)trimethylammonium chloride (APTAC), C8-C10 acrylate (ODA), isodecyl acrylate (ISODA), lauryl methacrylate (LM), stearyl methacrylate (SM), 2,2,2-Trifluoroethyl methacrylate, 2-Acrylamido-2-methyl-1-propanesulfonic acid, 2-Acrylamido-2-methyl-1-propanesulfonic acid sodium salt, [2-(Methacryloyloxy)ethyl]dimethyl-(3-sulfopropyl) ammonium hydroxide, [3-(Methacryloylamino)propyl]dimethyl(3-sulfopropyl)ammonium hydroxide inner salt, 1,6-hexanediol diacrylate (HDDA), dipropylene glycol diacrylate (DPGDA), tripropylene glycol diacrylate (TPGDA), 1,4-butanediol diacrylate (BDDA), Tripropylene glycol diacrylate (TPGDA), dipropyleneglycol diacrylate (DPGDA), Tripropylene glycol diacrylate (TRPGDA), 1,9-nonanediol diacrylate (NNDA), neopentyl glycol diacrylate (NPGDA), propoxylated neopentyl glycol diacrylate (NPG2PODA), polyethylene glycol (200) diacrylate (PEG (200)DA), polyethylene glycol (400) diacrylate (PEG(400) DA), polyethylene glycol (600) diacrylate (PEG(600)DA), ethoxylated bisphenol-A diacrylate (BPA2EODA), triethylene glycol diacrylate (TEGDA), triethylene glycol dimethacrylate (TEGDMA), glycerol propoxylated triacrylate (GPTA), diethylene glycol dimethacrylate (DEGDMA), ethoxylated bisphenol-A dimethacrylate (BPA10EODMA), trimethylolpropane triacrylate (TMPTA), pentaerythritol triacrylate (PET3A), ethoxylated tri-methylolpropane triacrylate (TMP3EOTA), propoxylated tri-methylolpropane triactylate (TMP3POTA), propoxylated glyceryl triacrylate (GPTA), trimethylolpropane trimethylacrylate (TMPTMA), ethoxylated trimethylolpropane trimethacrylate (TMP3EOTMA), 2,2-dionol diacrylate, pentaerythritol tetraacrylate (PETA), neopentylglycol diacrylate hydroxypivalate, 2-acryloyloxyethylphthalic acid, 2-acryloyloxyethyl-2-hydroxyethylphthalic acid, dimethyloltricyclodecane diacrylate, 2-acryloyloxyethylsuccinic acid, nonylphenol ethylene oxide adduct acrylate, methoxy-polyethylene glycol acrylate, tetramethylolmethane triacrylate, dipentaerythritol hexaaciylate (DPHA), modified polyacrylates including radiation-curable polyacrylate resins formed by reaction of acrylate monomers and oligomers with β-dicarbonyl compounds that can participate in a Michael addition reaction, isocyanate-functional unsaturated acrylic ester resin, urethane diacrylates oligomers, urethane acrylates, modified urethane acrylates, polyester acrylates, modified bisphenol A diacrylate, phenoxy-polyethylene glycol acrylate, bisphenol A propylene oxide modified diacrylate, bisphenol A ethylene oxide adduct diacrylate, pentaerythritol triacrylate hexamethylenediisocyanate, urethane prepolymer, isoamyl acrylate, isomyristyl acrylate, isostearyl acrylate, carbitol acrylate, cyclohexyl acrylate, tetrahydrofurfiuyl acrylate, 1,4-butane-diol-monoacrylate and/or diglycidyl ether of 1,4-butanediol, and the like.

Additional examples of reactive co-solvents include methyl vinylether, ethyl vinylether, propyl vinylether, n-butyl vinylether, t-butyl vinylether, 2-ethylhexyl vinylether, n-nonyl vinylether, lauryl vinylether, cyclohexyl vinylether, cyclohexylmethyl vinylether, 4-methylcyclohexylmethyl vinylether, benzyl vinylether, dicyclopentenyl vinylether, 2-dicyclopentenoxyethyl vinyl ether, methoxyethyl vinylether, ethoxyethyl vinylether, butoxyethyl vinyl ether, methoxyethoxy vinylether, ethoxyethoxyethyl vinylether, methoxypolyethylene glycol vinylether, tetrahydrofurfuryl vinylether, dodecyl vinylether, diethylene glycol monovinylether, 2-hydroxyethyl vinylether, 2-hydroxypropyl vinylether, 4-hydroxybutyl vinylether, 4-hydroxymethylcyclohexylmethyl vinylether, polyethylene glycol vinylether, chloroethyl vinylether, chlorobutyl vinylether, phenylethyl vinylether, phenoxypolyethylene glycol vinylether, ethylene glycol divinylether, butylenes glycol divinylether, hexandiol divinylether, bisphenol A alkyleneoxide divinylethers, bisphenol F alkyleneoxide divinylethers, propyleneoxide adducts of trimethylolpropane trivinylether, triethylene glycol divinylether, cyclohexane dimethanol divinylether, N-vinyl-2-pyrrolidone (VP), N-vinyl caprolactam (VCap), N-vinyl imidazole (VI), n-vinyl amides, 4-vinyl pyridine, 2-vinyl pyridine, styrene, 5-vinyl-2-norbornene and the like.

Non-limiting examples of monofunctional epoxy compounds include phenyl glycidylether, p-tert-butylphenyl glycidylether, butyl glycidylether, 2-ethylhexyl glycidylether, allyl glycidylether, 1,2-butyleneoxide, 1,3-butadienemonooxide, 1,2-epoxydodecane, epichlorohydrin, 1,2-epoxydecane, styreneoxide, cyclohexeneoxide, 3-methacryloyloxymethylcylcohexeneoxide, 3-acryloyloxymethylcylcohexeneoxide, 3-vinylcylcohexeneoxide, and the like.

Non-limiting examples of multifunctional epoxy compounds include 3,4-Epoxycyclohexylmethyl-3,4-epoxycyclohexane carboxylate, 3-ethyl-3-((ethyloxetane-3-yl) methoxy)methyl)oxetane, bisphenol A diglycidylether, bisphenol F diglycidylether, bisphenol S diglycidylether, brominated bisphenol A diglycidylether, brominated bisphenol F diglycidylethers, brominated bisphenol S diglycidylether, epoxy novolak resins, hydrogenated bisphenol A diglycidylethers, hydrogenated bisphenol F diglycidylethers, hydrogenated bisphenol S diglycidylethers, 3,4-epoxycyclohexylmethyl-3',4'-epoxycyclohexanecarboxylate, 2-(3,4-epoxycyclohexyl-5,5-spiro-3,4-epoxy)cyclohexane-meta-dioxane, bis(3,4-epoxycyclohexylmethyl)adipate, vinylcylcohexeneoxide, 4-vinylepoxycyclohexane, bis(3,4-epoxy-6-methylcyclohexylmethyl)adipate, 3,4-epoxy-6-methylcyclohexyl-3',4'-epoxy-6'-methylcyclohexane carboxylate, methylene-bis(3,4-epoxycyclohexane), dicyclopentadiene diepoxide, ethylene glycol di(3,4-epoxycyclohexylmethyl)ether, ethylene bis(3,4-epoxycyclohexanecarboxylate), epoxyhexahydrodioctyl phthalate, epoxyhexahydrodi-2-ethylhexyl phthalate, 1,4-butanediol diglycidylether, 1,6-hexanediol diglycidylether, glycerol triglycidylether, trimethylolpropane triglycidylether, polyethylene glycol diglycidylether, polypropylene glycol diglycidylether, 1,1,3-tetradecadienedioxide, limonenedioxide, 1,2,7,8-diepoxyoctane, 1,2,5,6-diepoxycyclooctane, and the like.

The compositions containing the reactive monomers and reactive co-solvents may be cured or cross-linked or polymerized by any appropriate known or yet to be developed method. The polymerization may be carried out by employing any method disclosed in "Principles of Polymerization" 4$^{th}$ edition, 2004, Wiley by George Odian, which is incorporated herein by reference in its entirety. Non-limiting exemplary methods include exposure to UV-radiation, UV-LED, laser beam, electron beam, and/or gamma irradiation or other high-energy source, and free-radical, cationic, anionic, or thermal polymerization, which may occur in the presence of suitable initiator(s) such as photoinitiators, free-radical initiators, anionic or cationic initiators, and thermal initiators. Suitable sources of radiation include, but are not limited to, mercury, xenon, halogen, and carbon arc lamps, sunlight, and radioactive sources.

A photoinitiator may be added to the compositions herein to initiate polymerization upon exposure of the composition to radiation. Suitable photoinitiators include those selected from the following non-limiting group of compounds: 2-hydroxy-2-methyl-1-phenylpropane-1-one, 1-hydroxycyclohex yl phenyl ketone, and 2-methyl-1-[4-(methylthio)phenyl]-2-morphorinopropane-1-on; benzoins e.g. benzyl dimethyl ketal; benzophenones such as benzophenone, 4-phenylbenzophenone, and hydroxybenzophenone; thioxanthones such as isopropylthioxanthone and 2,4-diethylthioxanthone; acylphosphine oxides; and other special initiators such as methyl phenyl glyoxylate; bis[4-(di(4-(2-hydroxyethyl)phenyl)sulfonio)phenyl sulfide], a mixture of bis[4-diphenylsulfonio]phenyl)sulfide bis(hexafluoroantimonate and diphenyl-4-thiophenoxyphenylsulfonium hexafluoroantimonate, bis[4-(di(4-(2-hydroxyethyl)phenyl) sulfonio)phenyl sulfide], 5-2,4-cyclopentadiene-1-yl-[(1,2, 3,4,5,6-.eta.)-(1-methylethyl-)benzene]-iron (1+)-hexafluorophosphate(1-)), 4-(2-hydroxytetradecanyloxy) diphenyliodonium hexafluoroantimonate, (4-hydroxynaphtyl)dimethylsulfonium hexafluoroantimonate), triphenylsulfonium hexafluorophosphate, triphenylsulfonium hexafluoroantimonate, 4-methoxyphenyldiphenylsulfonium hexafluoroantimonate, 4-methoxyphenyliodonium hexafluoroantimonate, bis(4-tert-butylphenyl)iodonium tetrafluoroborate, (bis(4-tert-butylphenyl)iodonium hexafluorophosphate), (bis(4-tert-phenyl)iodonium hexafluoroantimonate), (bis[4-(diphenylsulfonio)phenyl]sulfide bis (hexafluorophosphate)), Aryldiazonium salts, diaryliodonium salts, triaylsulfonium salts, triarylselenonium salts, dialkylphenacylsulfonium salts, triarylsulfoxonium salts, aryloxydiarylsulfonium salts, and the like for example, triphenylsulfonium hexafluorophosphate, methyldiphenylsulfonium hexafluorophosphate, dimethylphenylsulfonium hexafluorophosphate, diphenylnapththylsulfonium hexafluorophosphate, di(methoxynapththyl) methylsulfonium hexafluorophosphate, (4-octyloxyphenyl) phenyl iodonium hexafluoro antimonate, (4-octyloxyphenyl)diphenyl sulfonium hexafluoro antimonate, (4-decyloxyphenyl)phenyl iodonium hexafluoro antimonite, (4-dodecyloxyphenyl)diphenyl sulfonium hexafluoroantimonate. Particularly, employed photoinitaitors include 10-biphenyl-4-yl-2-isopropyl-9H-thixanthen-10-ium hexafurophosphate, 4,4'-dimethyl iodonium hexafluorophosphate, mixed triarylsulfonium hexafluorophosphate salts and reaction products of polyol and 10-(2-carboxymethoxy)-biphenyl-4-yl-2-isopropyl-9-oxo-9H-thioxanthen-10-ium hexaflruophosphate. Further, these photoinitiators are used alone or in combination thereof. Alternatively, if essential, the photoinitiator may be used by mixing it with one or more photopolymerization accelerator, such as a benzoic acid (e.g., 4-dimethylaminobenzoic acid) or a tertiary amine, in any appropriate ratio. The photoinitiator may be added to the photopolymerizable composition in the range of about 0.1% to about 20% by weight.

In one embodiment, the reactive monomers and/or the reactive co-solvents include a polymerizable moiety that may be reacted through free-radical polymerization in the presence of a free-radical initiator. To the polymerizable moiety may be any chemical moiety which upon exposure to an appropriate energy source (e.g., radiation or heat) decomposes into two independent uncharged fragments left with a highly reactive unpaired electron. Suitable free radical initiator for polymerization include, but are not limited to, various derivatives of peroxides, peresters and/or azo compounds. The free-radical initiator may be selected from dicumyl peroxide, dibenzoyl peroxide, 2-butanone peroxide, tert-butyl perbenzoate, di-tert-butyl peroxide, 2,5-bis(tert-butylperoxy)-2,5-dimethylhexane, bis(tert-butyl peroxyisopropyl)benzene, and tert-butyl hydroperoxide), diacyl peroxides, cumene hydroperoxide, dialkyl peroxides, hydroperoxides, ketone peroxides, monoperoxycarbonates, peroxydicarbonates, peroxyesters, and peroxyketals, including tertiary butyl perbenzoate, tertiary butyl peroctoate in diallyl phthalate, diacetyl peroxide in dimethyl phthalate, dibenzoyl peroxide, 1-hydroxy cyclohexyl-1-phenyl ketone, bis(2,4,6-trimethyl benzoyl)phenyl phosphine, benzoin ethyl ether, 2,2-dimethoxy-2-phenyl acetophenone, di(p-chlorobenzoyl) peroxide in dibutyl phthalate, di(2,4-dichlorobenzoyl) peroxide with dibutyl phthalate, dilauroyl peroxide, methylethyl ketone peroxide, cyclohexanone peroxide in dibutyl phthalate, 3,5-dihydroxy-3,4-dimethyl-1,2-dioxacyclopentane, t-butylperoxy(2-ethyl hexanoate), caprylyl peroxide, 2,5-dimethyl-2,5-di(benzoyl peroxy) hexane, 1-hydroxy cyclohexyl hydroperoxide-1, t-butyl peroxy (2-ethyl butyrate), 2,5-dimethyl-2,5-bis(t-butyl peroxy) hexane, cumyl hydroperoxide, diacetyl peroxide, t-butyl hydroperoxide, ditertiary butyl peroxide, 3,5-dihydroxy-3,5-dimethyl-1,2-oxacyclopentane, and 1,1-bis(t-butyl peroxy)-3,3,5-trimethyl cyclohexane and di-(4-t-butyl cyclohexyl)peroxydicarbonate, azo compounds such as azobisisobutyronitrile and azobiscyclohexanenitrile (e.g., 2,2'-azobis(2-methyl-propanenitrile), 2,2'-azobis(2-methylbutanenitrile), and 1,1'-azobis(cyclohexanecarbonitrile)) and the like including mixtures and combinations thereof.

Alternatively, the free-radical initiators disclosed above may be used for thermal based polymerization alone or as mixture thereof. Other suitable thermal initiators include 2,2'-azobis (2,4-dimethylpentanenitrile), 2,2'-azobis (2-methylpropanenitrile), 2,2'-azobis (2-methylbutanenitrile), peroxides such as benzoyl peroxide, and the like. In one embodiment, the thermal initiator is 2,2'-azobis(isobutyronitrile).

After curing, cross-linking, or polymerization of the composition, the structure (and presence) of the resulting polymer may be confirmed using spectral techniques known in the art. Non-limiting exemplary spectral techniques include $^1$H-NMR, $^{13}$C-NMR and FT-IR spectra.

In various embodiments, additives may be included in the described composition.

In one embodiment, a colorant may be included in the compositions. The colorant may be a pigment or dye. Combinations of pigments and dyes are also envisioned. Suitable pigments are described in Hunger's "Industrial Organic Pigments," Itoh's "Dictionary of Pigments," and Leach and Pierce's "Printing Ink Manual."

Examples of yellow colored, organic and inorganic, pigments include C.I. Pigment Yellow 1, C.I. Pigment Yellow 74, azo pigments such as C.I. Pigment 12 and C.I. Pigment Yellow 17 and the like.

Examples of black colored pigments include carbon black, titanium black, aniline black, and the like.

Examples of white colored pigments include basic lead carbonate, zinc oxide, barium sulfate, titanium oxide, silver white, strontium titanate, and the like.

Examples of red colored pigments include naphthol red (C.I. Pigment Red 2), C.I. Pigment Red 3, C.I. Pigment Red 176 and C.I. Pigment Red 23 and the like.

Examples of green colored pigments include phthalocyanine green (C.I. Pigment Green 7), C.I. Pigment Green 36, and C.I. Pigment Green 1 and the like.

Examples of blue colored pigments include phthalocyanine blue (C.I. Pigment Blue 15:3), C.I. Pigment Blue 15:6, and C.I. Pigment Blue 16 and the like.

In dispersing the pigment and/or the dye, dispersing machines and dispersants can be employed. Suitable dispersing machines include agitators, ball mills, bead mills, colloid mill, Cowles mixer, Henschel mixer, homogenizer, jet mill, John mill, kneader, pearl mill, roll mill, sand mill, STS mill, Tex mill, ultrasonic wave homogenizer, wet jet mill and the like. Suitable dispersants include carboxylic acids comprised of hydroxyl groups, long chain polyaminoamide salts with high molecular weight acid esters, high molecular weight polycarboxylic acid salts (Na and $NH_4$), alkyl pyrrolidones, the reactive monomer, high molecular weight copolymers, styrene acrylates, modified polyacrylates, polyvalent aliphatic carboxylic acids, naphthalenesulfonic acid/formalin condensates, polyoxyethylene alkylphosphoric esters, polyvinyl pyrrolidones, copolymers of vinyl pyrrolidone/vinyl acetates, alkylated polyvinyl pyrrolidones (alkylated with C4, C12, C20, C30, and the like), poly(maleic anhydride-co-methyl vinylether), poly(maleic anhydride-co-acrylic acid), copolymers of maleic anhydride, poly(tetrahydrofuran), Solsperse® dispersents (Zeneca), Zetasperse® Z-2100 and Z-2300 additives (Air Products), Surfynol® surfactants (104, 111, 121, 131, 136, 171, and 231 (Air Products)), Tamol™ dispersant (731 and 1124 (Rohm and Haas)), Troysperse® 90W dispersant (Troy), AMP-95™ 2-amino-2-methyl-1-propanol solution (ANGUS Chemie GmbH), BYK®-346 additive (BYK), and the like.

Examples of blue colored dyes include Acid Blue 1, Basic Blue 1 and C.I. Solvent Blue 7 and the like.

Examples of red colored dyes include Acid Red 18, Basic Red 1 and C.I. Solvent Red 8 and the like.

Examples of green colored dyes include Acid Green 1 and Basic Green 1 and the like.

Examples of black colored dyes include C.I. Solvent Black 5 and the like.

In one embodiment, an oil such as a drying or non-drying oil may be included in the compositions. Examples of drying oils include glycerides or triglycerides of fatty acids. Drying oils are characterized by the presence of unsaturated —CH═CH— groups. Additional examples of oils include oils of linseed, tung, oiticica, dehydrated castor, fish, and soya bean. Examples of non-drying oils include mineral, castor, and petroleum distillates.

In one embodiment, a resin, or high molecular weight polymer, may be included in the compositions. Examples of suitable resins include, acrylic polymers, polyvinylbutyral, polyurethanes, polyisocyanates, polyamides, polyesters, epoxies and polyepoxides, polyphenols, polycarbonates, polyvinylformal, shellac, vinylic, rubber based, waxes rosin, maleic resin and esters, manila copal, asphalts, starch and dextrin, gum Arabic, rosin modified phenolics, alkyds, terpenes, polystyrene, styrenic copolymers, styrene acrylates, silicone resins, alkylated urea formaldehyde resins, alkylated melamine formaldehyde resins, polyimides, poly(amide-imide) resins, chlorinated rubber, cyclized rubber, polyvinyl acetates, polyvinyl alcohols, alkylated polyvinyl alcohols, ketones resins, nitrocelluloses, ethyl cellulose, ethyl hydroxyethyl cellulose, cellulose acetate propionate, cellulose acetate butyrate, sodium carboxymethyl cellulose, polyethylene glycols and the like.

In one embodiment, a solvent may be included in the compositions. Suitable solvents can be identified in the Industrial Solvents Handbook, 4ed. edited by E. W. Flick (Noyes Daya Corp, Park Ridge, N.J., 1991). Additional insight to solvent selection is also available in the *Polymer Handbook,* 4ed. edited by J. Brandrup, E. H. Immergut, and B. A. Grulke (John Wiley, New York, 1999), which also describe *Solubility Parameters Values.* These references are understood to be incorporated herein by reference in their entirety.

Examples of suitable solvents include hydrocarbon solvents (i.e., white spirit and paraffin oils, low and high boiling), aromatic hydrocarbons (toluene, xylene, paraffins, and naphthenes), alcohols (ethanol, n-propyl, isopropyl, n-butyl), alicyclic alcohols (cyclohexanol), glycols (monoethylene, monopropylene, hexylene, diethylene, dipropylene, triethylene), glycerin, ketones (acetone, butan-2-one, hexone, sexton, isophorone, diacetone alcohol), esters (ethyl acetate, isopropyl acetate, n-butyl acetate), n-methyl-2-pyrrolidone, γ-butyrolactone and the like.

In one embodiment, a plasticizer may be included in the composition. Examples of suitable plasticizers include abietates, adipates, alkyl pyrrolidones, alkylated caprolactams, benzoates, butyrates, citrates, epoxidized compounds, phthalates, polyester, polyol esters, ricinoleates, sebacates, stearates, and sulphonamides. Additional information regarding plasticizers can be found in the National Printing Ink Research Institute (NPIRI) "Raw Materials Data Handbook" (Volume 2). Specific examples include triethyl citrate, epoxidized soya bean oils, dimethyl phthalate, glyceryl triacetate, butyl ricinoleate, butyl stearate, n-octyl-2-pyrrolidone, n-dodecyl-2-pyrrolidone, n-cocoyl-2-pyrrolidone, n-hydrogenated tallowyl-2-pyrrolidone and the like.

In one embodiment, a wax may be included in the composition. Examples of suitable waxes include polyethylene, polytetrafluoroethylene, fatty acid amides (i.e., stearamide), petroleum (i.e., paraffins, slack, scale, jelly, microcrystalline, ceresin, montan, montan esters), beeswax, carnauba, shellac, Japan, candelilla, lanolin, alkylated polyvinyl pyrrolidones (alkylated with C4, C12, C20, C30, and the like), and the like.

In one embodiment, a drier may be included in the compositions. Examples of suitable driers include oil soluble soaps (formed from octoates, resonates, naphthenates, tallates, linoleates), cobalt, cobalt acetate, manganese, cerium, zirconium, lithium, calcium, zinc, lead acetate, manganese borate and the like.

In one embodiment, a chelating agent may be included in the compositions. Examples of suitable chelating agents include ethylenediaminetetra-acetic acid and sodium salts, nitrilotriacetic acid salts, sodium salts of diethylenetriamineacetic acid, heptonates, alkanolamines, dimethyl glyoxime and the like.

In one embodiment, an anti-oxidant may be included in the compositions. Examples of suitable anti-oxidants include eugenol, hydroquinone, pyrocatechol, guaiacol, butylated hydroxytoluene, butylated hydroxyanisole, methylethyl ketoxime, butylaldoxime, cyclohexanone oxime and the like.

In one embodiment, a surfactant may be included in the compositions. Surfactants can also be employed in the presence of defoaming agents such as polydimethyl siloxanes and derivatives thereof. Examples of suitable surfactants include anionic (i.e., alkali metal soaps, ammonium and ammonium salts of long chain fatty acids), cationic (i.e., quaternary fatty ammonium halides, acetates, or suphates), non-ionic (i.e., polyethylene oxide chains attached to hydrocarbons), amphoteric and the like.

In one embodiment, deodorants and fragrances may be included in the compositions. Examples of suitable deodorants and fragrances include amyl and methyl salicylate, vanillin, citron, cedarwood, peppermint, lavender, carnation and the like.

In one embodiment, adhesion promoters may be included in the compositions. Examples of suitable adhesion promoters include titanium acetyl-acetonate, polyfunctional aziridines, polyethylene imines, chlorinated polyolefins, pentahydroxy(tetradecanoato)di-chromium, octadecanoato chromic chloride hydroxide, glycidoxy (epoxy) functional methoxy silane, β-(3,4-epoxycyclohexyl)ethyltriethoxysilane and the like.

In one embodiment, inhibitors may be included in the compositions. Examples of suitable inhibitors include hydroquinone, hydroquinone monomethyl ether, hydroquinone monopropyl ether, hydroquinone monobenzyl ether, amyl quinine, amyloxyhydroquinone, n-butylphenol, phenol, 4-methoxyphenol (MEHQ), phenothiazine, nitrobenzene and phenolic-thio compounds, alone or in combination thereof.

In one embodiment, laking agents may be included in the compositions. Examples of suitable laking agents include tannic acid and derivatives, shellac, maleic acids and the like.

In one embodiment, silica may be included in the compositions. Examples of suitable silicas include fumed, precipitated, gel, colloidal and the like.

In another embodiment, a stabilizer to inhibit the premature cross-linking may be included in the compositions. The stabilizers may include, but are not limited to, hydroquinone, hydroquinone monomethyl ether, hydroquinone monopropyl ether, hydroquinone monobenzyl ether, amyl quinine, amyloxyhydroquinone, n-butylphenol, phenol, 4-methoxyphenol (MEHQ), phenothiazine, nitrobenzene and phenolic-thio compounds, alone or in combination thereof.

In one aspect, the compositions may also include one or more additives in conventional quantities which may provide enhanced or altered properties to the compositions. These additives may be, but are not limited to, slip modifiers, thixotropic agents, laponites, flow or rheology control agents, UV-light absorbers, fungicides, bactericides, organic/inorganic filler particles (i.e., clays, kaolins), leveling agents, antistatic agents, viscosity modifier, therapeutic and/or preventive medicaments, and other ingredients apparent to those skilled in the art.

The compositions disclosed herein may include the reactive monomer as about 1 to about 50% by weight of the composition and the co-solvent as about 4 to about 80% by weight of the composition. Additionally, the compositions may include an initiator such as a photoinitiator or a polymerization initiator such as a free-radical initiator, a cationic initiator, an anionic initiator, or a thermal initiator as about 1 to about 10% by weight of the composition. If a colorant is included in the composition it may be present as about 1 to about 50% by weight of the composition. Other additives or components may be present in the composition as about 0.05 to about 60% by weight of the composition.

In one embodiment, the compositions disclosed herein include a resulting polymer produced by curing, cross-linking, or polymerizing a reactive monomer through any of the above methods. The compositions may be formulated for various applications such as industrial, personal care, household and pharmaceutical applications. Exemplary and non-limiting applications of the proposed compositions are in the field of coating-UV curable inks, newspaper inks, packaging inks, lithographic inks, offset inks, gravure inks and plates, flexographic inks and plates, screen inks, ink-jet inks, RFID devices, adhesive inter-layers, adhesion promoters, substrate penetrants, varnishes, labels, food wrappers, labels and colors for toys, labels and colors for pencils, labels and colors for comics, inks for postal application, inks for monetary application, inks for official government documents, over print varnish, visual identification, security inks, packaging, shrink wraps, container sleeves, metal inks and coatings, and anti-fog surfaces. Wherein, the compositions are produced as solid, liquid or powder or as a solution. These formulation may be applied to various surfaces as applicable to their intended use, for example, to metal such as steel, iron, copper, brass, gold, silver, and aluminum; to plastic such as vinyl, polyolefins such as polyethylene and polypropylene, Tyvec, polyester, PVDC, and nylon; to glass; and to a textile.

In another embodiment, the compositions may be adhesive compositions that includes the reactive monomer and reactive co-solvents as described above.

The compositions disclosed herein may be characterized as being conductive, metallic, pearlescent, fluorescent, and/or as exhibiting or having a thermal transition or phase change.

In one embodiment, the compositions may optionally include carbon nanostructures such nano-onions, horns, tubes, rods, wires, cones, dots, whiskers, filaments, nano-diamond, and graphene sheets. In another embodiment, the compositions disclosed herein may optionally include quantum dots.

The present invention is illustrated in detail by way of the following examples. The examples are for illustration and are not intended to be limiting.

Example 1

UV Curing Ink Base

| Material | Supplier | Mass (g) |
| --- | --- | --- |
| N-Vinyl Pyrrolidone | ISP | 9.875 |
| N-hydroxyethyl-2-pyrrolidone methyl methacrylate | Reactive monomer | 9.875 |
| Irgacure ® 184 | Ciba | 3.0 |
| PETA-4 (SR 295) | Sartomer | 76.75 |
| DABCO ® DC193 surfactant | Dow Corning | 0.5 |
| Total | | 100 |

Example 2

Offset Lithographic Ink

Based on Leach and Pierce's Printing Ink Manual (Kluwer, Boston, 1999) (the contents of which are hereby incorporated by reference) as a guide for the production of a standard dry offset lithographic ink, a modified formulation employing the reactive monomer was designed and is presented below:

| Raw Material | w/w % |
| --- | --- |
| Pigment | 18.0 |
| Acrylate prepolymer | 30.0 |
| Modifying hard resin | 25.0 |
| N-hydroxyethyl-2-pyrrolidone methyl methacrylate (Reactive monomer) | 16.0 |
| Photo-initiator and amine synergist | 9.0 |
| Polyethylene wax | 1.0 |
| Silicone fluid | 1.0 |

U.S. Pat. No. 7,232,851 and WO 2003/014239 (the contents of which are hereby incorporated by reference) may also be used as a guide for the production of a lithographic inks.

Example 3

Flexographic Ink

Based on U.S. Pat. No. 7,291,658 B2 (the contents of which are hereby incorporated by reference) as a guide for the production of a standard white flexographic ink, a modified formulation employing the reactive monomer was designed and is presented below:

| Raw Material | Description | Parts (w/w) |
| --- | --- | --- |
| Pigment | R-706 | 40.0 |
| Ashland D-30R | a radiation-curable polyacrylate resin | 17.5 |
| Ashland F-126R | Ashland resin | 28.0 |
| N-hydroxyethyl-2-pyrrolidone methyl methacrylate | Reactive Monomer | 10.0 |
| LG-37 | Reactive defoaming agent | 1.0 |
| BYK ® 019 | Silicone defoamer | 0.5 |
| ViaCure ® LX | UCB photoinitiator vehicle for light ink applications | 3 |

Example 4

Letterpress Ink

Based on U.S. Pat. No. 6,620,227 (B1) (the contents of which are hereby incorporated by reference) as a guide for the production of a CF (coated front) UV ink, a modified formulation employing the reactive monomer was designed and is presented below:

| Raw Material | Description | Parts (w/w) |
| --- | --- | --- |
| KC 98-1410 UV from Kohl & Madden Ink | UV curable ink base | 25.17 |
| Bis-(3-allyl-4-hydroxy phenyl) sulfone | Acidic color developer | 50.34 |
| N-hydroxyethyl-2-pyrrolidone methyl methacrylate | Reactive monomer and Reactive solvent | 23.49 |
| Darocure ® 4265 from Ciba | Photo-initiator | 1.00 |

Example 5

Screen Printing Ink

Based on U.S. Pat. No. 7,291,658 B2 (the contents of which are hereby incorporated by reference) as a guide for the production of a standard white screen-ink, a modified formulation employing the reactive monomer was designed and is presented below:

| Raw Material | Description | Parts (w/w) |
| --- | --- | --- |
| Pigment | R-706 | 41.2 |
| ViaScreen 515 | UCB Vehicle for screen printing applications | 30.1 |
| Ebecryl 110 | 2-Phenoxyethyl acrylate | 18.8 |
| N-hydroxyethyl-2-pyrrolidone methyl methacrylate | Reactive Monomer | 7.21 |
| LG-37 | Reactive defoaming agent | 1.0 |
| BYK ® 019 | Silicone defoamer | 0.5 |
| ViaCure ® LX | UCB photoinitiator vehicle for ink applications | 6 |

Additional teachings can be found in U.S. Pat. No. 5,395,863 (the contents of which are hereby incorporated by reference).

Example 6

Screen Printing Ink

Based on U.S. Pat. No. 4,418,138 A (the contents of which are hereby incorporated by reference) as a guide for the production of a standard black screen-ink, a modified formulation employing the reactive monomer was designed and is presented below:

| Raw Material | Parts (w/w) |
| --- | --- |
| Catofor 06 | 1.0 |
| 2-(carboxymethoxy)thioxanthone | 0.5 |
| Ethanol | 5.0 |
| Polyethylene glycol 200 diacrylate | 10.5 |
| N-hydroxyethyl-2-pyrrolidone methyl methacrylate (reactive monomer) | 4.5 |
| Uvecryl P101 | 2.0 |
| 20% Gohsenol KP08 solution | 50.0 |
| Anthrasol Blu-Black 1RD | 0.5 |
| Polyethylene glycol 200 | 1.0 |

Example 7

Ink-Jet Printing Ink

Based on WO 2007/036692 (A1) (the contents of which are hereby incorporated by reference) as a guide for the production of a standard UV inkjet ink, a modified formulation employing the reactive monomer was designed and is presented below:

| Raw Material | Description | Parts (w/w) |
| --- | --- | --- |
| Polyethylene glycol 200 diacrylate | oligomer | 9 |
| Ethoxylated (20) trimethylolpropane triacrylate | monomer | 4.5 |
| N-hydroxyethyl-2-pyrrolidone methyl methacrylate | Reactive monomer | 24.8 |
| Water | | 44.9 |
| Cab-O-Jet ® 300 | Carbon black pigment with carboxylate surface treatment for water application | 12.5 |
| Irgacure ® 2959 | Photo-initiator | 4 |
| FC4430 | fluorosurfactant | 0.2 |

Example 8

Electrophotographic Printing Ink

Based on U.S. Pat. No. 5,332,644 A (the contents of which are hereby incorporated by reference) as a guide for the production of a standard electrophotographic coating, a modified formulation employing the reactive monomer was designed and is presented below.

| Raw Material | Parts (w/w) |
| --- | --- |
| Benzimidazole perylene (BZP) | 9.25 |
| N-hydroxyethyl-2-pyrrolidone methyl methacrylate (reactive monomer) | 36.3 |
| Styrene | 54.45 |

Example 9

Intaglio Printing Ink

Based on U.S. Pat. No. 6,787,583 (B2) (the contents of which are hereby incorporated by reference) as a guide for the production of a intaglio UV ink, a modified formulation employing the reactive monomer was designed and is presented below:

| Raw Material | Parts (w/w) |
| --- | --- |
| Ebecryl 2002 | 46.6 |
| Montan Wax | 4.0 |
| N-hydroxyethyl-2-pyrrolidone methyl methacrylate (Reactive Monomer) | 1.5 |
| Emulsifier | 1.5 |
| UV Stabilizer | 2.0 |
| Igraliet ® Red 8B | 8.0 |
| CaCO$_3$ | 30.0 |
| Esacure ITX | 2.6 |
| Irgacure ® 369 | 3.8 |

Example 10

Printing Plate

Based on U.S. Pat. No. 4,011,084 (A) (the contents of which are hereby incorporated by reference) as a guide for the production of a UV curable printing plate, a modified formulation employing the reactive monomer was designed and is presented below:

| Raw Material | Parts (w/w) |
| --- | --- |
| Polyurethane/ester diacrylate | 75 |
| N-hydroxyethyl-2-pyrrolidone methyl methacrylate (Reactive monomer) | 25 |
| Benzoin methyl ether | 1 |
| Potassium salt of N-nitrosocyclohexylhydroxylamine | 0.05 |

While the foregoing written description of the invention enables one of ordinary skill to make and use the compositions described herein, those of ordinary skill will understand and appreciate the existence of variations, combinations, and equivalents of the specific embodiment, method, and examples herein. The invention should therefore not be limited by the above described embodiment, method, and examples.

What is claimed:

1. A curable ink composition capable of thermal or irradiative curing comprising:
   at least one reactive monomer that includes a lactam functional group and an ester functional group represented by formula (1):

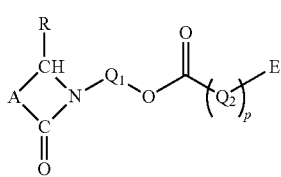 (1)

wherein:
   A is an alkyl or alkenyl group comprising 2 to 50 carbon atoms, wherein 2 to 4 carbon atoms reside in the lactam ring between the

group and the

group;
   E is a polymerizable moiety selected from the group consisting of: alkylacrylamides, acrylates, allyl derivatives, benzoxanes, cinnamyls, epoxies, fumarates, maleates, maleimides, α,β-olefinically unsaturated carboxylic nitriles, oxazolines, oxetanes, styrenes, vinyl acetates, vinyl acrylamides, vinyl amides, vinyl carbonates, vinyl ethers, vinyl halides, vinyl imidazoles, vinyl lactams, vinyl pyridines, vinyl silanes, vinyl sulfones, and mixtures thereof;
   p is 0 or 1;
   each of $Q_1$ and $Q_2$ is independently selected from the group consisting of functionalized and unfunctionalized alkyl, cycloalkyl, alkenyl, and aryl groups, wherein any of the beforementioned groups may be with or without heteroatoms; and
   each of R is independently selected from the group consisting of hydrogen, and functionalized and unfunctionalized alkyl, cycloalkyl, alkenyl, and aryl groups, wherein any of the beforementioned groups may be with or without heteroatoms; and
   a reactive co-solvent having a carbon-carbon double bond;
   wherein the reactive monomer is capable of reacting with the co-solvent to form a polymer.

2. The composition of claim 1 wherein the reactive co-solvent includes at least one of a (meth)acryl monomer or prepolymer, a (meth)acryl ester of an epoxy monomer or prepolymer, and a urethane monomer or prepolymer.

3. The composition of claim 2 wherein the reactive co-solvent is 2-phenoxy ethyl acrylate, a polyethylene glycol diacrylate, a polyester diacrylate, a radiation-curable polyacrylate resin, pentaerythritol tetraacrylate, a urethane diacrylate oligomer, a urethane acrylate, or styrene.

4. The composition of claim 1 wherein -(Q$_2$)$_p$-E provides the reactive monomer with polymerizable functionality.

5. The composition of claim 3 wherein -(Q$_2$)$_p$-E includes a carbon-carbon double bond.

6. The composition of claim 1, wherein the reactive monomer is selected from the group consisting of:

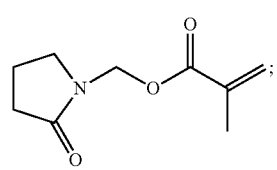

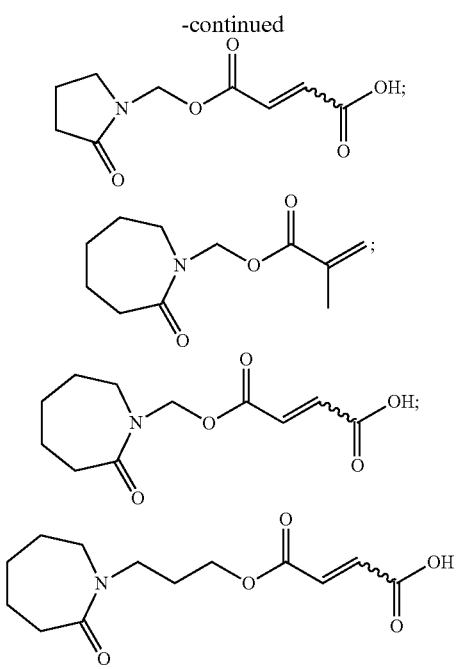

and combinations thereof.

7. The composition of claim 6 wherein the reactive monomer is N-hydroxymethyl-2-pyrrolidone methacrylate.

8. The composition of claim 1 further comprising a photoinitiator, a free-radical initiator, a cationic initiator, an anionic initiator, or a thermal initiator.

9. The composition of claim 8 further comprising at least one of a colorant, a dispersant, oil, a resin, a solvent, a plasticizer, a wax, a drier, a chelating agent, an anti-oxidant, a surfactant, a deodorant, a fragrance, an adhesion promoter, an inhibitor, a laking agent, silica, a stabilizer and a defoaming agent.

10. The composition of claim 9 comprising a colorant that includes a carbon pigment.

11. The composition of claim 1 wherein the composition is a lithographic ink, a flexographic ink, a gravure ink, a letterpress ink, a screening printing ink, ink-jet printing ink, an electrophotographic ink, an intaglio printing ink, or a collotype printing ink.

12. A curable ink composition capable of thermal or irradiative curing comprising:

at least one reactive monomer that includes a lactam functional group and an ester functional group represented by formula (1):

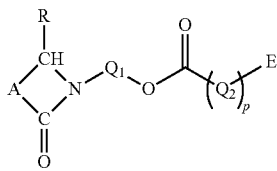 (1)

wherein:

A is an alkyl or alkenyl group comprising 2 to 50 carbon atoms, wherein 2 to 4 carbon atoms reside in the lactam ring between the

group and the

group;

E is a polymerizable moiety selected from the group consisting of: alkylacrylamides, acrylates, allyl derivatives, benzoxanes, cinnamyls, epoxies, fumarates, maleates, maleimides, α,β-olefinically unsaturated carboxylic nitriles, oxazolines, oxetanes, styrenes, vinyl acetates, vinyl acrylamides, vinyl amides, vinyl carbonates, vinyl ethers, vinyl halides, vinyl imidazoles, vinyl lactams, vinyl pyridines, vinyl silanes, vinyl sulfones, and mixtures thereof;

p is 0 or 1;

each of $Q_1$ and $Q_2$ is independently selected from the group consisting of functionalized and unfunctionalized alkyl, cycloalkyl, alkenyl, and aryl groups, wherein any of the beforementioned groups may be with or without heteroatoms; and each of R is independently selected from the group consisting of hydrogen, and functionalized and unfunctionalized alkyl, cycloalkyl, alkenyl, and aryl groups, wherein any of the beforementioned groups may be with or without heteroatoms;

a reactive co-solvent having a carbon-carbon double bond; and a curing initiator;

wherein the reactive monomer is capable of reacting with the reactive co-solvent to form a polymer.

13. The curable ink composition of claim 12 wherein the reactive co-solvent includes at least one of a (meth)acryl monomer or prepolymer, a (meth)acryl ester of an epoxy type monomer or prepolymer, and a urethane type monomer or prepolymer.

14. The curable ink composition of claim 13 wherein the reactive co-solvent is 2-phenoxy ethyl acrylate, polyethylene glycol diacrylate, a polyester diacrylate, a radiation-curable polyacrylate resin, pentaerythritol tetraacrylate, a urethane diacrylate oligomer, a urethane acrylate, or styrene.

15. The curable ink composition of claim 12 wherein $-(Q_2)_p$-E provides the reactive monomer with polymerizable functionality.

16. The curable ink composition of claim 15 wherein $-(Q_2)_p$-E includes a carbon-carbon double bond.

17. The curable ink composition of claim 12, wherein the reactive monomer is selected from the group consisting of:

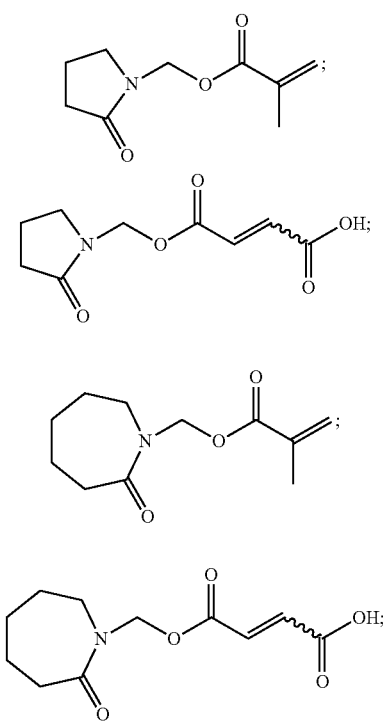

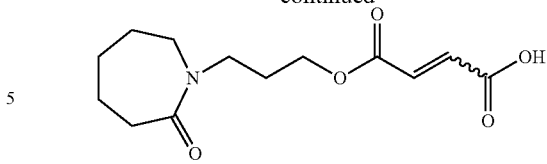

and combinations thereof.

18. The curable ink composition of claim 17 wherein the reactive monomer is N-hydroxymethyl-2-pyrrolidone methacrylate.

19. The curable ink composition of claim 12 wherein the curing initiator is a photoinitiator, a free-radical initiator, a cationic initiator, an anionic initiator, or a thermal initiator.

20. The curable ink composition of claim 19 further comprising at least one of a colorant, a dispersant, oil, a resin, a solvent, a plasticizer, a wax, a drier, a chelating agent, an anti-oxidant, a surfactant, a deodorant, a fragrance, an adhesion promoter, an inhibitor, a laking agent, silica, a stabilizer and a defoaming agent.

21. The curable ink composition of claim 20 comprising a colorant that includes a carbon pigment.

22. The curable ink composition of claim 12 wherein the curable ink is a lithographic ink, a flexographic ink, a gravure ink, a letterpress ink, a screening printing ink, ink-jet printing ink, an electrophotographic ink, an intaglio printing ink, or a collotype printing ink.

* * * * *